United States Patent
Bartholdt et al.

(10) Patent No.: US 10,268,807 B2
(45) Date of Patent: Apr. 23, 2019

(54) METHOD FOR PROTECTING A COMPUTER PROGRAM PRODUCT, COMPUTER PROGRAM PRODUCT AND COMPUTER-READABLE STORAGE MEDIUM

(71) Applicant: SIEMENS AKTIENGESELLSCHAFT, München (DE)

(72) Inventors: Jörg Bartholdt, München (DE); Sebastian Dippl, München (DE)

(73) Assignee: Siemens Aktiengesellschaft, München (DE)

( * ) Notice: Subject to any disclaimer, the term of this patent is extended or adjusted under 35 U.S.C. 154(b) by 189 days.

(21) Appl. No.: 14/411,086

(22) PCT Filed: May 3, 2013

(86) PCT No.: PCT/EP2013/059213
§ 371 (c)(1),
(2) Date: Jun. 8, 2015

(87) PCT Pub. No.: WO2014/000927
PCT Pub. Date: Jan. 3, 2014

(65) Prior Publication Data
US 2015/0310192 A1    Oct. 29, 2015

(30) Foreign Application Priority Data

Jun. 25, 2012   (DE) .................. 10 2012 210 747

(51) Int. Cl.
*G06F 21/12*  (2013.01)
*H04L 29/06*  (2006.01)

(52) U.S. Cl.
CPC ............ *G06F 21/121* (2013.01); *H04L 63/20* (2013.01); *G06F 2221/0775* (2013.01)

(58) Field of Classification Search
CPC ............................ G06F 21/121; H04L 63/20
See application file for complete search history.

(56) References Cited

U.S. PATENT DOCUMENTS 5,490,216 A * 2/1996 Richardson, III ...... G06F 21/10
                                                                    705/59
7,277,718 B2   10/2007 Wong
(Continued)

FOREIGN PATENT DOCUMENTS

| CN | 101201883 A    | 6/2008 |           |
|----|----------------|--------|-----------|
| EP | EU1224788 B1 * | 6/2004 | H04L 29/06 |
| EP | 2273411 A2     | 1/2011 |           |

OTHER PUBLICATIONS

Wikipedia: "NetFlow" in Wikipedia, the free Encyclopedia. Jun. 10, 2012 [retrieved Apr. 11, 2016].
(Continued)

*Primary Examiner* — Carl G Colin
*Assistant Examiner* — Vance M Little
(74) *Attorney, Agent, or Firm* — Lempia Summerfield Katz LLC

(57) ABSTRACT

A method for protecting a computer program product, the computer program product being configured for operation in an operating environment (e.g., a virtual operating environment), includes: detecting at least one operating parameter of the operating environment in which the computer program product is executed, the at least one operating parameter having been defined outside of the operating environment; comparing the detected at least one operating parameter to a comparison value stored for each operating parameter; and outputting a warning signal if a plurality of comparison results exceeds a predetermined threshold value, wherein the comparison results indicate an execution of the computer program product in a different operating environment.

19 Claims, 2 Drawing Sheets

1 - Computer Program Product
2 - Operating Environment
3 - Virtual Operating Environment
4 - Data Network
5 - First Computer System
6 - Second Computer System
7 - Internet Server
8 - Network Interface
9 - Virtual Network Interface
10 - Gateway
11 - Internet
17 - Warning Signal

(56) References Cited

U.S. PATENT DOCUMENTS

| | | | |
|---|---|---|---|
| 7,536,356 B2 | 5/2009 | Eng | |
| 8,205,241 B2 | 6/2012 | Lakshminarayanan et al. | |
| 2004/0203648 A1* | 10/2004 | Wong | H04W 4/18 |
| | | | 455/414.1 |
| 2005/0216729 A1 | 9/2005 | Joels et al. | |
| 2007/0027815 A1* | 2/2007 | Sobel | G06F 21/105 |
| | | | 705/59 |
| 2007/0255813 A1 | 11/2007 | Hoover et al. | |
| 2009/0245122 A1* | 10/2009 | Maiocco | H04L 43/08 |
| | | | 370/252 |
| 2009/0328225 A1* | 12/2009 | Chambers | G06F 21/10 |
| | | | 726/26 |
| 2010/0305989 A1* | 12/2010 | Mu | G06Q 10/0635 |
| | | | 705/7.28 |
| 2012/0011241 A1* | 1/2012 | Etchegoyen | G06F 21/105 |
| | | | 709/223 |

OTHER PUBLICATIONS

German Office Action for German Application No. 10 2012 210 747.9, dated Apr. 13, 2016, with English Translation.
PCT International Search Report and Written Opinion of the International Searching Authority dated Aug. 20, 2013 for corresponding PCT/EP2013/059213.
Chinese Office Action for related Chinese Application No. 201380033862.8 dated Nov. 18, 2016.

* cited by examiner

FIG 1

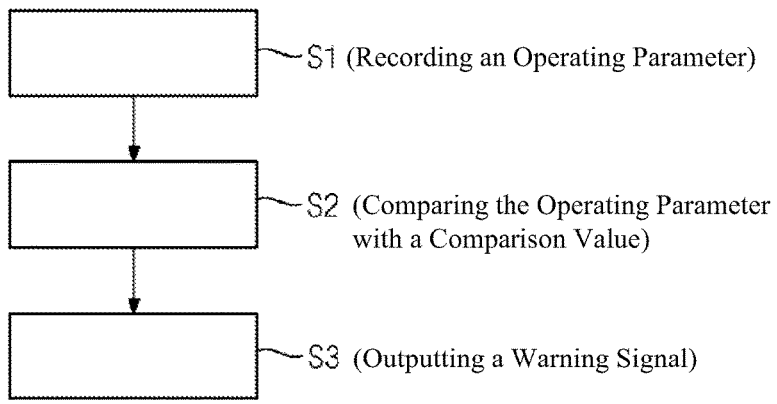

- S1 (Recording an Operating Parameter)
- S2 (Comparing the Operating Parameter with a Comparison Value)
- S3 (Outputting a Warning Signal)

FIG 2

```
traceroute to wikipedia.de (130.94.122.197), 30 hops max, 40 byte packets
1  192.168.0.1 (192.168.0.1)
2  217.5.98.7 (217.5.98.7)
3  217.237.152.46 (217.237.152.46)
4  62.154.14.134 (62.154.14.134)
5  p16-1-0-3.r20.asbnva01.us.bb.verio.net (129.250.9.141)
6  ge-1-1.a03.sndgca01.us.da.verio.net (129.250.27.84)
7  Pliny.wikipedia.org (130.94.122.197)
```

```
traceroute to wikipedia.de (130.94.122.197), 30 hops max, 40 byte packets
1  192.168.0.1 (192.168.0.1)
2  130.149.5.98 (130.149.5.98)
3  130.149.1.12 (130.149.1.12)
4  p16-1-0-3.r20.asbnva01.us.bb.verio.net (129.250.9.141)
5  ge-1-1.a03.sndgca01.us.da.verio.net (129.250.27.84)
6  Pliny.wikipedia.org (130.94.122.197)
```

1 - Computer Program Product
2 - Operating Environment
3 - Virtual Operating Environment
4 - Data Network
5 - First Computer System
6 - Second Computer System
7 - Internet Server
8 - Network Interface
9 - Virtual Network Interface
10 - Gateway
11 - Internet
17 - Warning Signal

METHOD FOR PROTECTING A COMPUTER PROGRAM PRODUCT, COMPUTER PROGRAM PRODUCT AND COMPUTER-READABLE STORAGE MEDIUM

RELATED APPLICATIONS

This application is the National Stage of International Application No. PCT/EP2013/059213, filed May 3, 2013, which claims the benefit of German Patent Application No. DE 102012210747.9, filed Jun. 25, 2012. The entire contents of both documents are hereby incorporated herein by reference.

TECHNICAL FIELD

The present teachings relate generally to a method for protecting a computer program product, a computer program product, and a computer-readable storage medium.

BACKGROUND

Software manufacturers lose large amounts of money every year due to the illegal use of unlicensed software. Therefore, the protection of computer programs from unauthorized use is important in software development.

Conventional methods for protecting computer programs from unauthorized use provide, for example, a hardware apparatus (e.g., a dongle) that is used to protect a computer program from unauthorized execution. For example, the dongle may be a memory that stores a license key. This license key may then be read from the memory by the respective computer program (e.g., during starting of the computer program) and may be checked.

A dongle may be designed to carry out cryptographic functions. For example, a dongle may carry out a "challenge-response" method in combination with a respective computer program.

However, the use of a dongle involves dongle hardware and access to a connection of the respective computer.

Protection methods implemented in software may also be used to protect computer programs. Such methods may be based on monitoring characteristic data relating to the computer system on which the respective computer program is executed.

For example, during installation, a computer program may store the identifier of the processor (e.g., the CPU ID) of the computer on which the computer program is installed. During each system start, the computer program may then check whether the processor of the computer on which the computer program is executed is the processor identified by the computer program during installation. Additional characteristic data relating to the computer that facilitate identification may also be used.

However, the use of characteristic data relating to the computer system on which a computer program is executed is problematic when the computer program is executed in a "virtual machine" (e.g., a virtual computer system). The virtual machine may allow the characteristic data to be manipulated or feigned. Furthermore, an image of a virtual machine may be readily copied after the computer program has been installed.

SUMMARY AND DESCRIPTION

The scope of the present invention is defined solely by the appended claims, and is not affected to any degree by the statements within this summary.

The present embodiments may obviate one or more of the drawbacks or limitations in the related art. For example, in some embodiments, improved protection of computer program products is provided.

A method for protecting a computer program product operated in a virtual operating environment is provided that includes the following acts: recording at least one operating parameter for the operating environment in which the computer program product is executed, the operating parameter being defined outside the operating environment; comparing the recorded operating parameters with a comparison value stored for the respective operating parameter; and outputting a warning signal if a number of comparison results exceeds a predefined threshold value, the comparison results indicating an execution of the computer program product in an operating environment other than that in which the comparison values were recorded.

A computer program product is provided that includes computer instructions for carrying out a method in accordance with the present teachings.

A computer-readable storage medium includes a computer program product in accordance with the present teachings.

In accordance with the present teachings, operating parameters of the respective operating environment may be manipulated with the aid of virtual operating environments. As a result, a method is provided for recognizing whether a computer program product is operated in the operating environment in which the computer program product was originally installed.

At least one operating parameter that is defined outside the operating environment may be recorded. The recorded operating parameters are compared with comparison values recorded for the respective operating parameters.

The stored operating parameters may be stored, for example, when installing the computer program product inside the respective operating environment.

For each operating parameter, the comparison with the stored operating parameters indicates whether a computer program product is operated in the operating environment in which the stored operating parameters were recorded, or whether the corresponding computer program product is operated in an operating environment that is different than the operating environment in which the stored operating parameters were recorded.

A warning signal is output if the number of comparisons indicating that the corresponding computer program product is being operated in an operating environment that is different than the operating environment in which the stored operating parameters were recorded exceeds a threshold value.

Thus, the operation of a computer program product may be monitored even when the computer program product is operated in a virtualized operating environment.

In some embodiments, the at least one operating parameter defined outside an operating environment includes a subnet mask and/or predefined addresses of predefined systems of a data network coupled to the operating environment. The subnet mask may be a fixed variable in a data network. A change in the subnet mask may indicate a potential move of the computer program product to a new operating environment.

In some embodiments, the at least one operating parameter defined outside an operating environment includes a DNS server address. Like the subnet mask in a data network, the address of the DNS server may be constant and, therefore, may effectively contribute to recognizing a move of the computer program product.

In some embodiments, the at least one operating parameter defined outside an operating environment includes neighboring systems that may be reached by the computer program product in the data network. Permanently installed computer systems may be used in data networks belonging, for example, to companies. A change in the neighboring systems that may be reached by the computer program may likewise indicate a move of the computer program product to another operating environment.

In some embodiments, the at least one operating parameter defined outside an operating environment includes SNMP devices that may be reached by the computer program product. A change in the SNMP devices that may be reached by the computer program likewise indicates a move of the computer program product to another operating environment.

In some embodiments, the at least one operating parameter defined outside an operating environment includes at least part of a network route to known Internet servers. If a computer program transmits a request to an Internet server, the request may run through an internal network belonging to a company or to an Internet provider until the request is fed into the actual Internet. Therefore, a change in at least the internal part of the network route may indicate a move of the computer program to a new operating environment.

In some embodiments, the at least one operating parameter defined outside an operating environment includes a data transmission time (e.g., PING time) to known Internet servers. Although the data transmission time is not a constant, the data transmission time may change within a certain fluctuation range in the event of a request to a known server. Therefore, a drastic deviation of the data transmission time from a known value for the data transmission time may indicate a move of the computer program product to a new operating environment.

In some embodiments, the respective operating parameter is compared with a defined comparison value and/or with a range of values and/or with a Boolean value during comparison. This comparison may provide suitable options for each operating parameter. For example, addresses such as the subnet mask or the address of the DNS server may be compared with a stored address value. When comparing the data transmission time, a check may be carried out, for example, to determine whether the data transmission time is in a data transmission time range. The data transmission time range may be formed, for example, from the corresponding past data transmission times.

In some embodiments, each of the operating parameters is allocated a weighting, and the number of comparisons is calculated using a weighted sum calculated based on the allocated weighting. As a result, a higher priority may be allocated to certain parameters when determining a move.

In some embodiments, the starting of the computer program product may be prevented in addition to outputting the warning signal, thereby providing effective copy protection.

In some embodiments, a license key may be queried in addition to outputting the warning signal. Despite the recognition of a move of the computer program product, the computer program product may be reactivated.

In some embodiments, the computer program product is in the form of a library and/or a program module of a further computer program product. For example, the computer program product may be integrated in further computer program products as a copy protection mechanism. In some embodiments, a computer program product in accordance with the present teachings may prevent the execution of the further computer program products.

The above refinements and developments may be combined in any desired manner. Additional refinements, developments, and implementations of the present teachings include combinations of features described herein with respect to exemplary embodiments although the combinations themselves may not be explicitly described.

BRIEF DESCRIPTION OF THE DRAWINGS

FIG. 1 shows a flowchart of an example of a method in accordance with the present teachings.

FIG. 2 shows two tables with examples of network routes to the wikipedia.de server.

In the drawing figures, identical or functionally identical elements and apparatuses have been provided with the same reference symbols unless otherwise indicated.

DETAILED DESCRIPTION

Figure 3:
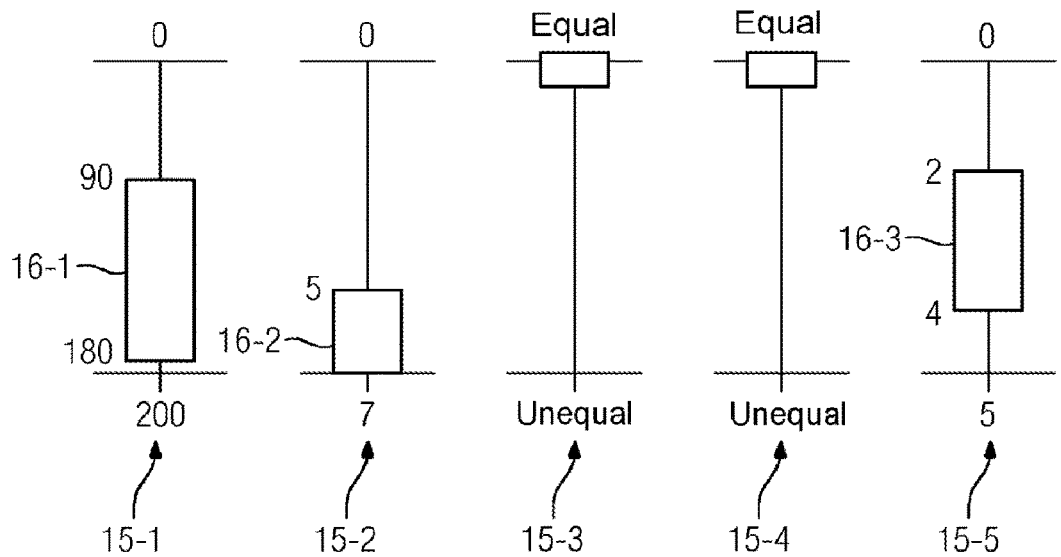
FIG. 3 shows a schematic illustration of an example of a plurality of operating parameters.

FIG. 1 shows a flowchart of an example of a method in accordance with the present teachings.

In a first act S1, at least one operating parameter 15-1-15-5 that is defined outside an operating environment 2, 3 is recorded for the operating environment 2, 3 in which the computer program product 1 is executed.

A second act S2 also provides for the recorded operating parameters 15-1-15-5 to be compared with a comparison value stored for the respective operating parameter 15-1-15-5. The stored comparison values for the operating parameters 15-1-15-5 are the values that are recorded and stored in that operating environment 2, 3 in which the computer program product 1 was originally installed or for which the computer program product was originally licensed.

In a third act S3, a warning signal 17 is output if a number of comparison results indicating execution of the computer program product 1 in another operating environment 2, 3 exceeds a predefined threshold value. In some embodiments, the execution of the computer program product 1 may also be prevented. As used herein, execution in another operating environment 2, 3 refers to the execution of the computer program product 1 in an operating environment 2, 3 in which the computer program product 1 was not originally installed and/or for which the comparison values were not stored.

A method in accordance with the present teachings may also be carried out using a computer program product 1 as a module of a further computer program product. The computer program product 1 may be used to monitor and control the execution of the further computer program product.

In some embodiments, a license key for the computer program product 1 may be queried when a move of the operating environment 2, 3 is recognized. The license key facilitates reactivation of the computer program product.

In computer-based operating environments (e.g., data networks and computing centers), the operating environment of a computer program product may change. Therefore, in accordance with the present teachings, the operating parameters 15-1-15-5 of the operating environment 2, 3 may be selected such that a change in the operating parameters 15-1-15-5 reliably indicates whether or not the computer program product 1 is executed in that operating environment 2, 3 in which the computer program product 1 was originally installed. The recognition accuracy may be modified by changing the number of operating parameters 15-1-15-5 used and by changing the predefined threshold value.

The operating parameters 15-1-15-5 defined outside an operating environment 2, 3 may be different operating parameters 15-1-15-5 that may be recorded using, for example, network interfaces.

Operating parameters that may be used include the following: a subnet mask; predefined addresses of predefined systems (e.g., printers or the like) in the data network 4; a DNS server address; an address of a standard gateway; reachable neighboring systems 5, 6 in the data network 4; reachable SNMP devices; at least part of a network route to known Internet servers 7; a data transmission time to known Internet servers 7; and source addresses of ARP requests.

Comparison values and/or ranges of values and/or Boolean values defined for comparing S2 the respective operating parameters 15-1-15-5 may be predefined for the multiplicity of operating parameters 15-1-15-5.

For example, comparison values defined for network addresses may be stored. For a data transmission time, a range of values may be stored since the data transmission time is also dependent on the instantaneous load situation of the data network 4 and the load situation of the Internet or the called Internet server 7. In some embodiments, tolerance ranges, thresholds, or variances may also be stated for changes in individual operating parameters 15-1-15-5.

The threshold value may be set based on the desired recognition rate. A trade-off is made between how quickly a move is to be recognized and how often false recognitions may be tolerated.

In some embodiments, a weighting is allocated to each of the operating parameters 15-1-15-5. The number of comparisons is calculated using a weighted sum based on the respectively allocated weighting, thereby facilitating adaptation of the method to different boundary conditions.

FIG. 2 shows two tables with examples of network routes to the wikipedia.de server in accordance with the present teachings. The tables were recorded using the "traceroute" program that records and outputs the route from the executing computer to the target system.

As shown in FIG. 2, the table entries 2, 3 and 4 in the two tables are not identical. As a result, for the private network and the subnetwork in which the operating environment 2, 3 of the computer program product 1 is arranged, different computer systems forward the request until the request continues on a common route at entry 5 (upper table) and entry 4 (lower table).

For example, differences in the first systems according to the subnetwork 4 in which the operating environment 2, 3 of the computer program product 1 is arranged indicate a move of the operating environment 2, 3.

FIG. 3 shows a schematic illustration of an example of a plurality of operating parameters 15-1-15-5 in accordance with the present teachings.

The operating parameter 15-1 is the ping time to a Google server. The operating parameter 15-2 is the number of matches during a traceroute run. The operating parameter 15-3 is a comparison of its own IP address. The operating parameter 15-4 is a source address of ARP requests. The operating parameter 15-5 is the number of neighboring systems in the data network 4 that may be reached by UDP protocol at certain port numbers.

A range of between 90 ms and 180 ms is specified for the operating parameter 15-1. Therefore, if a ping time to a Google server is between 90 ms and 180 ms, a move is not assumed.

A range of between 5 and 7 is specified for the operating parameter 15-2. Therefore, if the number of matches during a traceroute run is below 5, a move is assumed.

A comparison is carried out for the operating parameters 15-3 and 15-4 to determine whether the operating parameters 15-3 and 15-4 correspond to the stored values.

A range of between 2 and 4 is specified for the operating parameter 15-5.

In other embodiments, a different number of operating parameters 15-1-15-5 may be included in the set of operating parameters 15-1-15-5. In addition, different comparison values, ranges, or the like may be specified.

Figure 4:
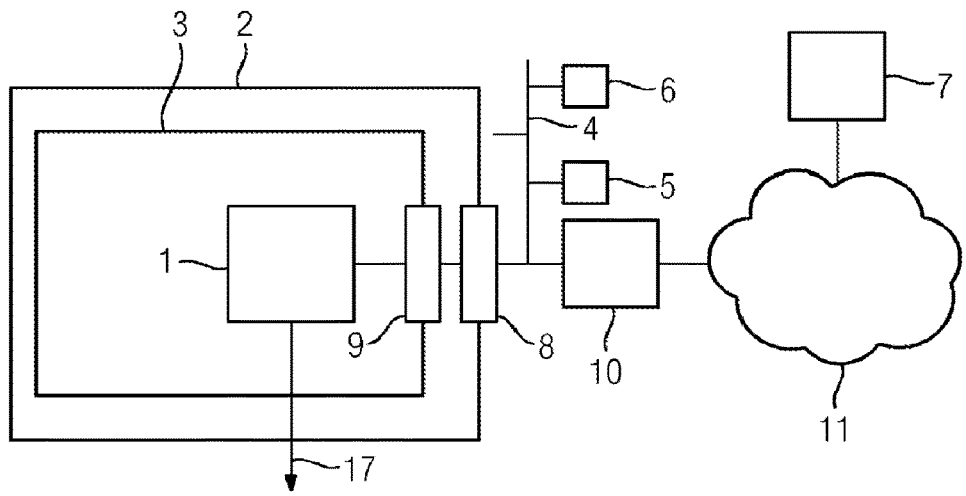
FIG. 4 shows a block diagram of an example of an operating environment of an exemplary computer program product in accordance with the present teachings.

FIG. 4 shows a block diagram of an example of an operating environment 2, 3 of an exemplary computer program product 1 in accordance with the present teachings.

FIG. 4 shows an example of an operating environment 2 having a network interface 8 that may be, for example, a computer server. A virtual operating environment 3 having a virtual network interface 9 is shown inside the operating environment 2. The virtual operating environment 3 may be, for example, a virtual PC that is executed as a computer program on the server 2. The computer program product 1 in accordance with the present teachings is installed in the virtual PC 3. The computer program product is designed to communicate via the virtual network interface 9 that is coupled to the actual network interface 8 of the computer server 2.

The actual network interface 8 is coupled to a data network 4 having an additional first computer system 5 and a second computer system 6 that are coupled to the data network 4. The data network 4 is also coupled to a standard gateway 10 that is configured to couple the data network 4 to the Internet 11. An Internet server 7 (e.g., the wikipedia.de server) is coupled to the Internet.

If the method in accordance with the present teachings or the computer program product 1 in accordance with the present teachings is executed in the illustrated operating environment 2, the additional first computer system 5 and the second computer system 6 may be recognized and stored, for example. The address of the standard gateway 10 may also be stored. In addition, the route and the ping time to the wikipedia.de server 7 may be stored.

If the virtual operating environment 3 were moved to another computer server 3 in another computer network, the above-described parameters would be likely to change and the move would be detectable.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether indepen-

The invention claimed is:

1. A method for protecting a computer program product, the computer program product being configured for operation in a virtual operating environment and a physical operating environment, the method comprising:
recording, by the computer program product via a virtual network interface of the virtual operating environment and a network interface of the physical operating environment, at least one operating parameter for the virtual operating environment and the physical operating environment executing the computer program product, wherein the at least one operating parameter is defined in a network outside of the virtual operating environment and the physical operating environment, the network coupled to the physical operating environment via the network interface of the physical operating environment;
comparing, by the computer program product, the recorded at least one operating parameter with a comparison value stored for the respective operating parameter, wherein each comparison value is stored within the respective operating environment in which the computer program product was installed; and
outputting, by the computer program product, a warning signal when a plurality of comparison results exceeds a predefined threshold value, wherein the warning signal indicates execution of the computer program product in a different virtual operating environment and a different physical operating environment than the virtual operating environment and the physical operating environment for which the comparison values were recorded and stored, therein indicating that the computer program product has been moved to a new operating environment; and
preventing continued operation of the computer program product when the plurality of comparison results exceeds the predefined threshold value.

2. The method of claim 1, wherein the at least one operating parameter defined in the network outside the physical operating environment comprises a subnet mask, predefined addresses of predefined systems of the network coupled to the physical operating environment, or the subnet mask and the predefined addresses of predefined systems of the network coupled to the physical operating environment.

3. The method of claim 1, wherein the at least one operating parameter in the network defined outside the physical operating environment comprises a DNS server address, an address of a standard gateway, or the DNS server address and the address of a standard gateway.

4. The method of claim 1, wherein the at least one operating parameter defined in the network outside the physical operating environment comprises neighboring systems that are reachable by the computer program product in the network.

5. The method of claim 1, wherein the at least one operating parameter defined in the network outside the physical operating environment comprises SNMP devices that are reachable by the computer program product.

6. The method of claim 1, wherein the at least one operating parameter defined in the network outside the physical operating environment comprises at least part of a network route to known Internet servers.

7. The method of claim 1, wherein the at least one operating parameter defined in the network outside the physical operating environment comprises a data transmission time to at least one known Internet server.

8. The method of claim 1, wherein the respective operating parameter is compared with a defined comparison value, a range of values, a Boolean value, or a combination thereof.

9. The method of claim 1, wherein each of the at least one operating parameter is allocated a weighting, and wherein the number of comparison results is calculated using a weighted sum based on the allocated weighting.

10. The method of claim 1, further comprising:
querying a license key; and
reactivating operation of the computer program product despite recognition of the move to the new operating environment.

11. A method for protecting a computer program product, the computer program product being configured for operation in a virtual operating environment and a physical operating environment, the method comprising:
recording, by the computer program product via a virtual network interface of the virtual operating environment and a network interface of the physical operating environment, at least one operating parameter for the physical operating environment executing the computer program product, wherein the at least one operating parameter is defined in a network outside the physical operating environment, the network coupled to the physical operating environment via the network interface of the physical operating environment;
comparing, by the computer program product, the recorded at least one operating parameter with a comparison value stored for the respective operating parameter, wherein each comparison value is stored within the respective operating environment in which the computer program product was installed;
outputting, by the computer program product, a warning signal when a plurality of comparison results exceeds a predefined threshold value, wherein the warning signal indicates execution of the computer program product in a different physical operating environment than the physical operating environment in which the comparison values were recorded and stored, therein indicating that the computer program product has been moved to a new operating environment; and
preventing, continued operation of the computer program product when the plurality of comparison results exceeds the predefined threshold value.

12. The method of claim 11, wherein the computer program product comprises a library, a program module of a further computer program product, or the library and the program module of the further computer program product.

13. A non-transitory computer-readable storage medium having stored therein data representing instructions executable by a programmed processor for protecting a computer program product, the computer program product being configured for operation in a virtual operating environment and a physical operating environment, the storage medium comprising instructions for:
recording, by the computer program product via a virtual network interface of the virtual operating environment and a network interface of the physical operating environment, at least one operating parameter for the virtual operating environment and the physical operating environment in which the computer program product is executed, wherein the at least one operating parameter is defined outside of the virtual operating environment and the physical operating environment, the network coupled to the physical operating environment via the network interface of the physical operating environment;

comparing, by the computer program product, the recorded at least one operating parameter with a comparison value stored for the respective operating parameter, wherein each comparison value is stored within the respective operating environment in which the computer program product was installed;

outputting, by the computer program product, a warning signal when a plurality of comparison results exceeds a predefined threshold value, wherein the warning signal indicates execution of the computer program product in a different virtual operating environment and a physical different operating environment than the virtual operating environment and the physical operating environment in which the comparison values were recorded and stored, therein indicating that the computer program product has been moved to a new operating environment; and preventing, continued operation of the computer program product when the plurality of comparison results exceeds the predefined threshold value.

14. The method of claim 2, wherein the at least one operating parameter defined outside of the virtual operating environment and the physical operating environment comprises a DNS server address, an address of a standard gateway, or the DNS server address and the address of a standard gateway.

15. The method of claim 2, wherein the at least one operating parameter defined outside of the virtual operating environment and the physical operating environment comprises neighboring systems that are reachable by the computer program product in a data network.

16. The method of claim 3, wherein the at least one operating parameter defined outside of the virtual operating environment and the physical operating environment comprises neighboring systems that are reachable by the computer program product in a data network.

17. The method of claim 2, wherein the at least one operating parameter defined outside of the virtual operating environment and the physical operating environment comprises SNMP devices that are reachable by the computer program product.

18. The method of claim 3, wherein the at least one operating parameter defined outside of the virtual operating environment and the physical operating environment comprises SNMP devices that are reachable by the computer program product.

19. The method of claim 1, wherein the comparison values are indicative of a virtual operating environment and a physical operating environment in which the computer program product was installed.

* * * * *